US008356301B2

(12) United States Patent  
Wu et al.

(10) Patent No.: US 8,356,301 B2  
(45) Date of Patent: Jan. 15, 2013

(54) OPTIMIZATION OF QUEUED EVENTS BY DELETION/INTEGRATION BASED ON CPU LOAD CALCULATION

(75) Inventors: Jianming Wu, Saitama (JP); Toshiaki Uemukai, Saitama (JP); Fumiaki Sugaya, Saitama (JP)

(73) Assignee: KDDI Corporation, Tokyo (JP)

( * ) Notice: Subject to any disclaimer, the term of this patent is extended or adjusted under 35 U.S.C. 154(b) by 1143 days.

(21) Appl. No.: 12/211,376

(22) Filed: Sep. 16, 2008

(65) Prior Publication Data

US 2009/0083752 A1    Mar. 26, 2009

(30) Foreign Application Priority Data

Sep. 20, 2007 (JP) ................... 2007-243382

(51) Int. Cl.
*G06F 9/00* (2006.01)
(52) U.S. Cl. ...................................................... 718/100
(58) Field of Classification Search .................. None
See application file for complete search history.

(56) References Cited

U.S. PATENT DOCUMENTS

| 4,896,290 | A  | * | 1/1990  | Rhodes et al. ................ 710/67 |
| 5,860,107 | A  | * | 1/1999  | Patel ........................... 711/140 |
| 7,434,012 | B1 | * | 10/2008 | Ives et al. ..................... 711/159 |
| 7,434,109 | B1 | * | 10/2008 | Stabile et al. ................ 714/47.2 |
| 7,486,276 | B2 | * | 2/2009  | Yajima et al. ................ 345/168 |
| 7,559,062 | B2 | * | 7/2009  | Code et al. .................... 718/102 |
| 7,644,392 | B2 | * | 1/2010  | Geipel et al. ................. 717/121 |

FOREIGN PATENT DOCUMENTS

| JP | 5-151180 A    | 6/1993  |
| JP | 10-333927 A   | 12/1998 |
| JP | 2000-137621 A | 5/2000  |
| JP | 2001-331329 A | 11/2001 |
| JP | 2004-287755 A | 10/2004 |
| JP | 2005-038110 A | 2/2005  |
| JP | 2005-222274 A | 8/2005  |
| JP | 2006-302065 A | 2/2006  |
| JP | 2006-163612 A | 6/2006  |

OTHER PUBLICATIONS

Hirayama, JP 2004-287755 (JPO Machine Translation), Oct. 14, 2004, 6 pages.*

* cited by examiner

*Primary Examiner* — David Huisman
(74) *Attorney, Agent, or Firm* — Westerman, Hattori, Daniels & Adrian, LLP

(57) ABSTRACT

An event processing apparatus has a central processing unit (CPU) and an event queue that temporarily accumulates a plurality of events when occurring. The CPU executes an event queue optimization module for executing filtering processes to delete one or more events based on optimization definition information, and/or for executing chunking processes to integrate a plurality of events into an event, for a plurality of events accumulated in the event queue, based on a CPU load calculation involving the sum of mean CPU-execution-times for unexecuted tasks corresponding to the queued events.

11 Claims, 6 Drawing Sheets

FIG. 6

AFTER EVENT QUEUE OPTIMIZATION (b)

| EVENT ID | DEVICE/OPERATION TYPE | OCCURRENCE TIME | OPERATION DATA |
|---|---|---|---|
| 0023 | Mouse/Click | 69500 | 1 |
| 0022 | Mouse/Click | 69300 | 1 |
| 0021 | Mouse/Move | 69200 | (−36, −5) |
| 0015 | MobileKeyboard/Press | 68810 | (F1 key, 1) |
| 0014 | Mouse/Move | 68600 | (−74, −41) |
| 0008 | MobileKeyboard/Press | 67700 | (Left key, 1) |
| 0007 | MobileKeyboard/Press | 67400 | (Enter key, 1) |
| 0006 | FullKeyboard/Press | 67100 | (Esc key, 1) |
| 0005 | Mouse/Move | 66990 | (+6, −14) |
| 0002 | MobileKeyboard/Press | 66760 | (Left key, 1) |
| 0001 | MobileKeyboard/Press | 66460 | (Left key, 1) |

OPTIMIZATION OF QUEUED EVENTS BY DELETION/INTEGRATION BASED ON CPU LOAD CALCULATION

PRIORITY CLAIM

The present application claims priority from Japanese Patent Application No. 2007-243382 filed on Sep. 20, 2007, which is incorporated herein by reference.

BACKGROUND OF THE INVENTION

1. Field of the Invention

The present invention relates to an event processing apparatus and a method for an operating system. In particular, it relates to a task execution technology of an operating system in an embedded apparatus with an on-board Central Processing Unit (CPU).

2. Description of the Related Art

An embedded apparatus with an on-board CPU implements an operating system. The operating system executes a plurality of events that are generated from input devices or other functional units, as a task, by using the CPU. An event occurs independently of execution of application programs. Also, a task is a unit to be processed or transacted based on the viewpoint from the operating system (or users). Usually, tasks are executed sequentially based on an occurrence order of events.

The apparatus has event queues for accumulating these events temporarily. According to an event-driven type processing technology, these events are read out sequentially from the queue. This technology sequentially processes events. Thus, unless a whole event is completely processed, the following event will not be read out.

FIG. 1 is a functional configuration diagram of an event processing apparatus based on a related art.

According to FIG. 1, the apparatus 1 has an input device unit 11, a CPU unit 12, another functional unit 13 and an operating system (OS) 10. The operating system 10 functions by execution of programs in the CPU unit 12. The input device unit 11 generates the events corresponding to the operation of the user or the apparatus function. The events are output to the operating system 10.

The input device unit 11 has a plurality of input devices and/or communication devices. Events that are generated from the input device unit 11 have information of a device/operation type, an occurrence time (for example, a lapsed time (unit: ms) from when the apparatus starts), and/or operational data (for example, a keycode of a key switch, or a movement variable of a mouse).

According to FIG. 1, the operating system 10 has an event control module 101, a plurality of event queues 102, an event processing module 103, a task queue 104 and a task executing module 105. These functional modules are realized by the programs being executed by the CPU 12.

The event control module 101 inputs the events generated from the input device unit 11 into the event queue 102. The events are put into the event queues 102 and are brought into a waiting state of FIFO (First In First Out). Also, the event control module 101 pulls out each event from the event queues 102. The event is output to the event processing module 103.

The event processing module 103 converts the event received from the event control module 101 into a task based on an application. The task is input into the task queue 104. The task queue 104 accumulates the task temporarily (FIFO). The task outputted from the task queue 104 is executed by the task executing module 105 using the CPU 12.

According to the above mentioned event driven processing, when a mass of events occurs for a short time, a number of events are accumulated in the event queue 102. In such a case, till processing of all events accumulated already in the event queue 102 are finished, unexecuted events are placed in the waiting state. As a result, there has been a problem that an application response is slow.

To attempt to solve this problem, according to Japanese Patent Application Publication No. 2000-137621, a priority is attached to an individual event, and each event is inserted into one of the plural event queues 102 selected based on its priority. According to FIG. 1, a plurality of event queues are provided, and one of the events is taken out from the event queue 102 with a higher priority. For the accumulated events with the same priority, however, the events are taken out sequentially from the event queue 102 in a manner that one of the events which first entered the event queue 102 is first taken out from the event queue 102.

According to Japanese Patent Application Publication No. 2004-287755, the event control module 101 also gives a time stamp to the event when occurring. According to this technique, in the case of two events of the same type, when the time interval of their time stamps is shorter than a predetermined threshold value, the event control module 101 executes only one event and deletes the other event. Owing to this, the situation that many events stay in the event queue is prevented. For example, when a user of the apparatus operates the same key repeatedly many times, events based on these key operations can be deleted.

In recent years, the above mentioned OS is also installed in a terminal with lower computing capability like a cellular phone or a personal digital assistance. Because of miniaturization and high efficiency of device technology, a pointing device (a key switch, a mouse or a track-point or a track pad), a ten key, a full-keyboard, an acceleration sensor and a touch panel are also attached or connected to a small embedded apparatus as input devices. Furthermore, through short distance radio communication techniques such as infrared or Bluetooth (registered trademark), there are input devices which operate an application executed on a cellular phone. For example, there is a wireless mouse and a wireless remote controller with a built-in acceleration sensor. Because an event generated by such input devices is converted into a task and the task is executed, pointing operations or scrolling operation on a cellular phone can be executed like a personal computer.

However, the computing performance of a CPU built in a cellular phone is far lower than that of a CPU built in a personal computer. Therefore, depending on user operations for the cellular phone, there is a case that a large number of events occur serially from the input devices for a short time. In this case, it is necessary to execute these events effectively.

According to the technique described in Japanese Patent Application Publication No. 2000-137621, addition of priority information to each event increases an amount of information by the priority information. Also, the use efficiency of a memory becomes lower in order to satisfy the necessity of managing a plurality of event queues. Furthermore, in the case in which there are a plurality of event queues, the order in which events are input and the order in which the events are output may be different, and an attempt to keep actual event input/output orders to follow FIFO makes the use efficiency of a memory lower.

According to the technique described in Japanese Patent Application Publication No. 2004-287755, an event that should not be deleted may be mistakenly deleted, because it is determined whether the event should be deleted only based on the time interval of the time stamps.

BRIEF SUMMARY OF THE INVENTION

An object of the present invention is to provide an event processing apparatus and a method capable of effectively processing a number of events that occur for a short time, even for an embedded apparatus that is equipped with a CPU with low computing performance and that contains an OS.

The present invention is based on an event processing apparatus having an event queue that temporarily accumulates a plurality of events when occurring.

According to the present invention, an apparatus is configured to have an event queue optimization module for executing filtering processes to delete one or more events based on optimization definition information, and/or for executing chunking processes to integrate a plurality of events into an event, for a plurality of events accumulated in the event queue.

It is preferred that the event processing apparatus is configured such that the event queue optimization module dynamically selects the filtering processes and/or the chunking processes depending on a CPU load.

It is preferred that the apparatus further has a task queue for temporarily accumulating a plurality of tasks relating to a plurality of events read out from the event queue, and a CPU load calculation module for calculating a task execution time for all of the unexecuted tasks accumulated in the task queue, as the CPU load.

It is preferred that the apparatus further has a task execution module for executing a task read out from the task queue, and a task execution time memory for receiving the task execution time from the task execution module, and for storing a mean execution time corresponding to a task identifier, wherein, the CPU load calculation module calculates the CPU load by dividing a sum of mean execution time for all of the unexecuted tasks accumulated in the task queue by a CPU time per transaction, using the task execution time memory.

It is preferred that the apparatus is configured such that the event queue optimization module is executed at predetermined time intervals or upon a user operation for instructing event-queue optimization.

It is preferred that the apparatus is configured such that each event has a device/operation type, an occurrence time, and/or operation data, the optimization definition information defines predetermined conditions for the device/operation type, the occurrence time, and/or the operation data in case of executing the filtering processes and/or the chunking processes, and the event queue optimization module decides whether all events accumulated in the event queue meet the predetermined conditions of the optimization definition information.

It is preferred that the apparatus is configured to such that when at least one selected process includes one or more filtering processes, the event-queue optimization module executes an operation-data-based filtering process in which, if the operation data for each one of the plurality of events is undefined, or if an operation amount represented by the operation data is smaller than a predetermined first threshold value, then the each event is deleted. The event-queue optimization module executes a time-based filtering process in which, if a time between consecutive ones of the plurality of events that are identical in the device/operation type is shorter than a predetermined second threshold value, then at least one of the consecutive events are deleted. And, when the at least one selected process includes the one or more chunking processes, the event-queue optimization module executes an identical-event chunking process in which, a sub-plurality of the plurality of events which are identical in the device/operation type occurring consecutively for a predetermined length of time are integrated into one event, and the event-queue optimization module executes a different-event chunking process in which a sub-plurality of the plurality of events which are not identical in the device/operation type meeting a predetermined term are integrated into one event.

It is preferred that the apparatus is configured such that the event queue optimization means locks the event queue for stopping temporarily input/output operations of events before the filtering processes and/or the chunking processes are executed, and for unlocking the event queue after executing the filtering processes and/or the chunking processes.

It is preferred that the predetermined conditions for the optimization definition information change depending on a CPU processing capability and/or a memory capacity.

The present invention is based on an event processing method for making a computer to control execution of tasks based on a plurality of events accumulated temporarily in an event queue.

According to the present invention, a method has the steps of, for a plurality of events accumulated in the event queue, executing filtering processes to delete one or more events based on optimization definition information, and/or executing chunking processes to integrate a plurality of events into an event.

According to the event processing apparatus of the present invention and the method, because the number of events accumulated in the event queue can be reduced based on optimization definition information, a large number of events that occur for a short time can be processed effectively, even if the apparatus is an embedded apparatus that is equipped with a CPU with a low computing performance and that contains an OS.

BRIEF DESCRIPTION OF THE SEVERAL VIEWS OF THE DRAWINGS

FIG. 6 is an optimization illustration for an event queue according to an embodiment of the present invention.

DETAILED DESCRIPTION OF THE INVENTION

Figure 2:
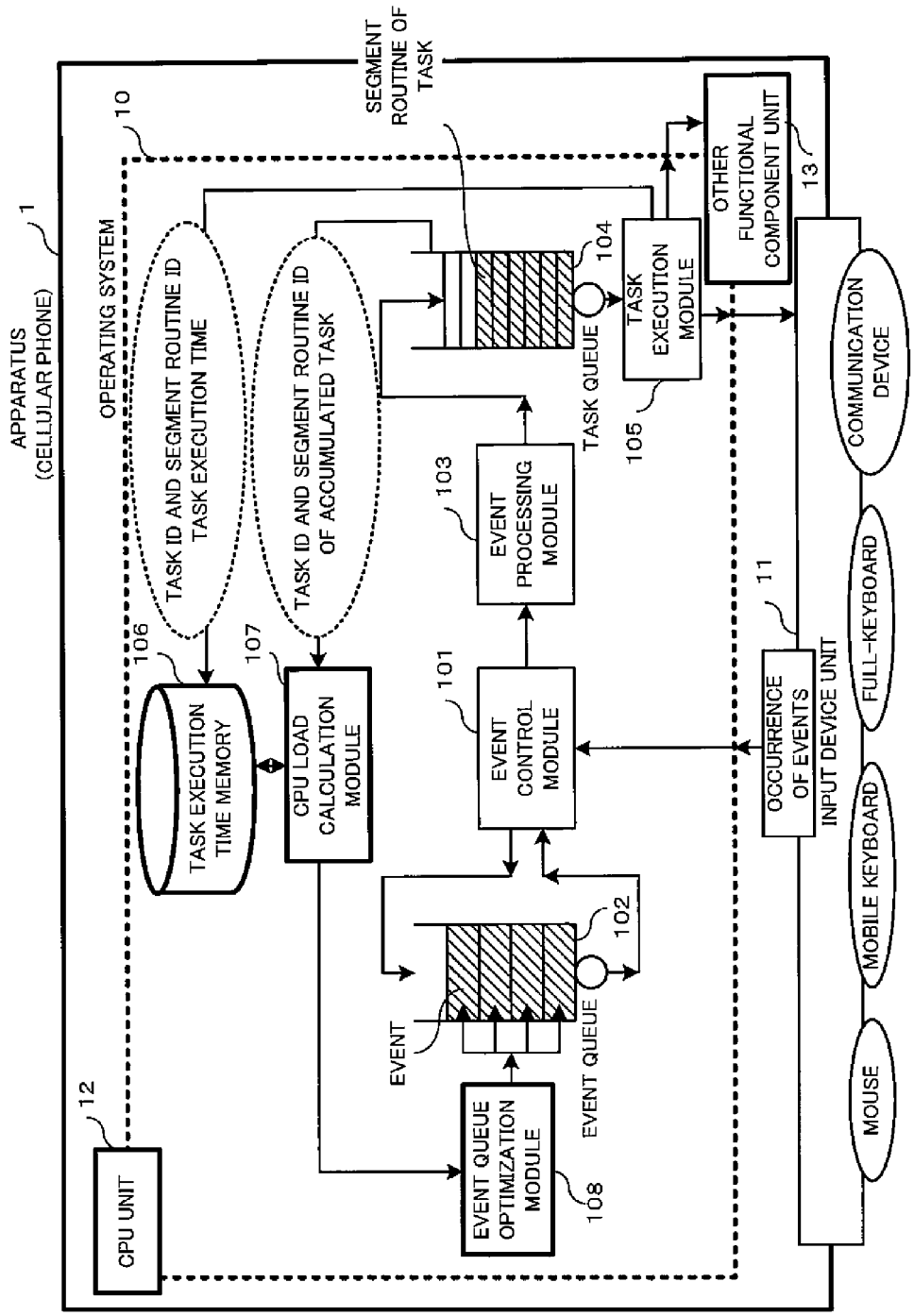
FIG. 2 is a functional configuration diagram of an event processing apparatus according to an embodiment of the present invention.

FIG. 2 is a functional configuration diagram of an event processing function according to an embodiment of the present invention.

Figure 1:
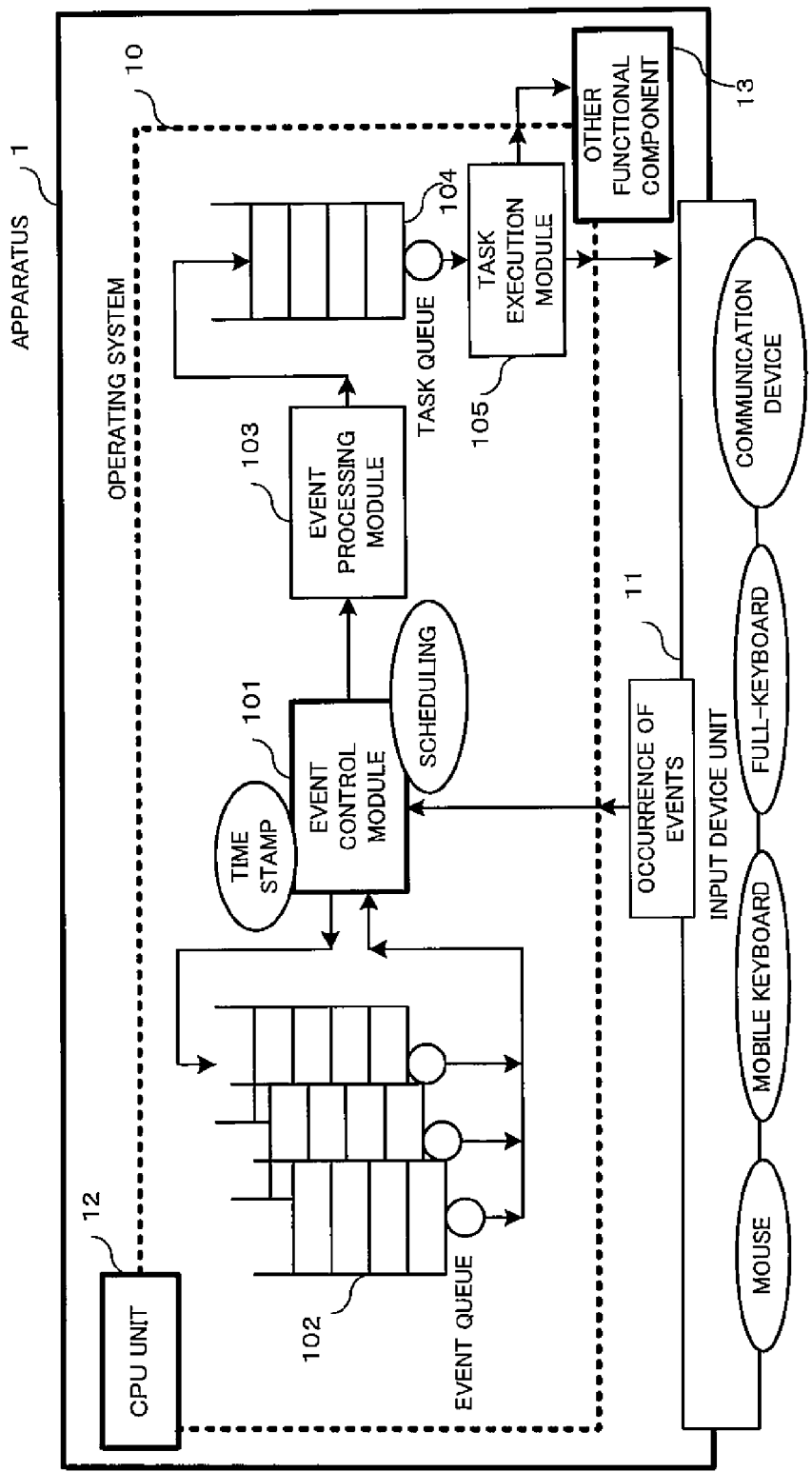
FIG. 1 is a functional configuration diagram of an event processing apparatus based on a related art.

Comparing to FIG. 1, an operating system 10 in FIG. 2 further has a task execution time memory 106, a CPU load calculation module 107 and an event queue optimization module 108. These functional modules are realized by programs executed by the CPU unit 12.

The task execution time memory 106 receives a task identifier and a task execution time from the task execution module 105. The task identifier specifically includes a task ID (IDentifier) and a segment routine ID. The event processing module 103 generates the task based on the application from an event, and the task is divided into segment routines (SR, Segment Routine). The segment routines are units generated by subdividing one task corresponding to an execution breakpoint described as an execution command. Thus, whenever the task execution module 105 executes a subdivided segment routine, an attribute of the segment routine, namely the task ID and a segment routine ID, and a task execution time, are output to the task execution time memory 106.

The task execution time memory 106 stores the mean execution time of the task associated with the task ID and the segment routine ID. The task execution time memory 106 updates the mean execution time of the task, each time the task execution time is received from the task execution module 105.

The CPU load calculation module 107 calculates the execution time for all of the unexecuted tasks accumulated in the task queue 104 as a CPU load. The CPU load calculation module 107, therefore, receives task IDs and segment routine IDs for all of the unexecuted tasks accumulated in the task queue 104.

Then, the CPU load calculation module 107 receives each mean execution time for each task ID and segment routine ID from the task execution time memory 106.

The CPU load calculation module 107 calculates the CPU load by dividing the total sum of the mean execution times for all of the unexecuted tasks accumulated in the task queue 104 by a CPU processing time per unit transaction. The CPU load calculated by the following equation is output to the event queue optimization module 108 at predetermined time intervals.

CPU load=total summation of mean execution times for all of the unexecuted tasks/CPU time per transaction.

Figure 3:
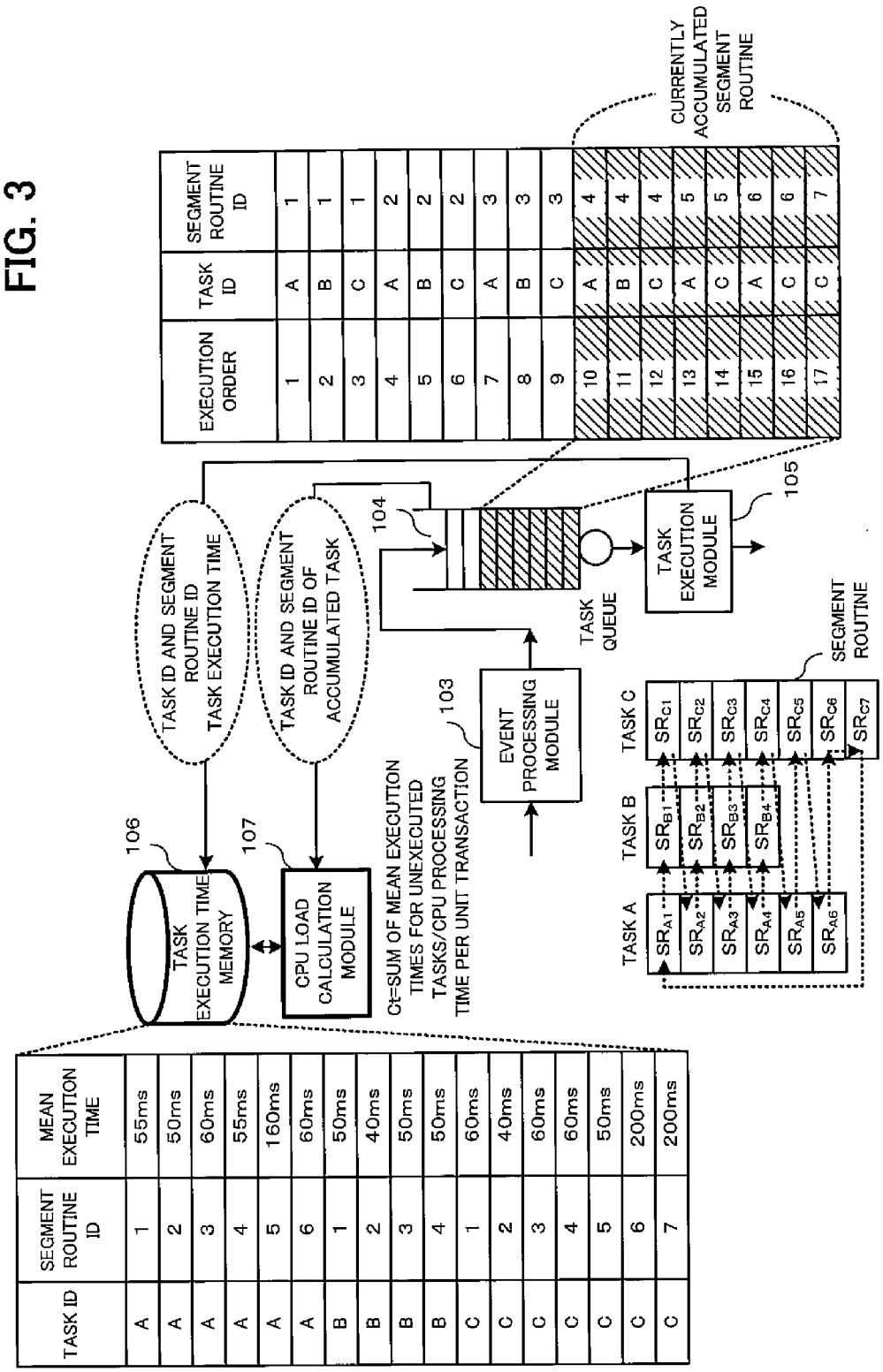
FIG. 3 is an example of a mean execution time accumulated in a task execution time memory.

FIG. 3 shows an example of a mean execution time accumulated in the task execution time memory 106.

According to FIG. 3, three tasks A, B and C based on an application are shown. Here, the OS is assumed to execute in a single-thread mode, but it seems to work in a pseudo multi-thread mode. Each task has plural segment routines. The task A has segment routines SRA1-SRA6, the task B has segment routines SRB1-SRB4, and the task C has segment routines SRC1-SRC7.

According to FIG. 3, these segment routines are executed in the order of segment routine SRA1 of task A, segment routine SRB1 of task B and segment routine SRC1 of task C. Next, these segment routines are executed in the order of segment routine SRA2 of task A, segment routine SRB2 of task B and segment routine SRC2 of task C. In FIG. 3, the execution sequence of the segment routine of tasks A, B and C is shown.

The execution order of segment routines of a task is not limited to executing the segment routine of each task one by one in turn as shown in FIG. 3. For example, it is allowed that all segment routines of the task A are executed first and then all segment routines of the task B are executed. It is also allowed that a plurality of segment routines are executed in one time slice (execution time unit).

The task execution time memory 106 stores each mean execution time associated with the task ID and the segment routine ID. According to FIG. 3, for example, the mean execution time of segment routine 1 of task A is 55 ms.

Also, according to FIG. 3, segment routines accumulated in the task queue 104 at the moment are SRA4, SRA5, SRA6, SRB4, SRC4, SRC5, SRC6 and SRC7. Then, according to FIG. 3, the sum of the mean execution times for each segment routine and CPU load Ct are as follows:

SRA4=55 ms, SRA5=160 ms, SRA6=60 ms, SRB4=50 ms,
SRC4=60 ms, SRC5=50 ms, SRC6=200 ms and SRC7=200 ms.

Thus, the sum of these mean execution time equals 835 ms (=55 ms+160 ms+60 ms+50 ms+60 ms+50 ms+200 ms+200 ms). By assuming that the CPU processing time per transaction equals 1000 ms, CPU load Ct is 0.835 (=835 ms/1000 ms).

Then, referring to FIG. 2, the operating system 10 of the present embodiment further has an event queue optimization module 108. The event queue optimization module 108 executes "filtering process" to delete one or more events accumulated in the event queue 102 and/or "chunking process" to integrate plural events into one event, based on optimization definition information.

The optimization definition information defines predetermined conditions for "device/operation type", "occurrence time" and/or "operation data" in the case of executing "filtering process" and/or "chunking process". The event queue optimization module 108 determines whether all events accumulated in the event queue 102 meet predetermined conditions of the optimization definitions information.

According to the present embodiment, the filtering process includes "operation-data-based filtering (or operation data filtering)" and "time-based filtering (or time filtering)," and the chunking process includes "identical-event-based chunking (same type event chunking)" and "different-event-based chunking (different type event chunking)." The event queue optimization module 108 executes a successively and dynamically selected one of these four processes according to the CPU load.

[Operation-Data-Based Filtering Process]

For an event, if the operation data are undefined or an operation amount represented by the operation data is smaller than a predetermined threshold value, the event is deleted. For example, regarding an event for the movement of a pointing device such as a mouse, when the operation amount (i.e., a movement distance (a Euclidean distance) of the mouse per unit time) is smaller than a predetermined threshold value, the event is deleted. Also, for an event of a key pressing operation of a mobile keyboard such as a ten-key or a full-keyboard, when a key-code corresponding to the key that is pressed is undefined, the event is deleted.

[Time-Based Filtering Process]

For a plurality of consecutive events of the same type, if a time interval between the occurrence times of adjacent two of the consecutive events is shorter than a predetermined threshold value, at least one of the adjacent events is deleted. In an example where events each for the movement of a pointing device such as a mouse occur consecutively, and if the occurrence time interval of the adjacent events is shorter than the predetermined threshold value, a last one of the adjacent events is deleted. Also, In an example where events each for a key pressing operation of a mobile key-board such as a ten-key or a full-keyboard occur consecutively, when the occurrence time interval of these events is shorter than the predetermined threshold value, a last one of the events is deleted.

[Identical-Event-Based Chunking Process]

When plural events of the same device/operation type occur consecutively during a predetermined period of time, these events are integrated into one event. For example, when events for the movement of the pointing device such as a mouse occur consecutively, these events are integrated into one event having an operation amount which is representative of the sum of operation amounts of these events. Also, when N consecutive events each for a key pressing operation of a mobile key-board such as the ten-key or full-keyboard occur, and the events correspond to a pressing operation of an "arrow key," these events are integrated into one event in association with the N times of the arrow key operations (the number of times that the arrow key was depressed). Furthermore, in an example where consecutive events are for pressing one of the keys of a key board, and where the key-code of the pressed key is a "key for task change," only the last one of the events is executed and the preceding one or more events are deleted.

[Different-Event-Based Chunking Process]

When plural events of different device/operation types satisfy predetermined conditions, the events are integrated into one event. In an example, both a pointing device such as a mouse and a mobile key-board such as a ten-key or a full-keyboard are used, two or more sets of consecutive events occur consecutively, a first one of the consecutive events for each set is for pressing the "key for task change," a second one of the consecutive events for each set (Mouse/Move event) is for moving the mouse, and a time interval between the first event and the second event is shorter than the predetermined threshold value. In such a case, the Mouse/Move events for the two or more consecutive sets are integrated into one event, and the first event for the "key for task change" for a last one of the two or more consecutive sets remain, while the first event for the "key for task change" for other consecutive sets are deleted.

In another scenario, two or more sets of consecutive events occur consecutively, a first one of the consecutive events for each set is for pressing a "decision key (enter key)" of the keyboard, a second one of the consecutive events for each set (Mouse/Move event) is for clicking the mouse, and a time interval between the first event and the second event is shorter than the predetermined threshold value. In such a case, while the first event is deleted, the second event is processed.

Figure 4:
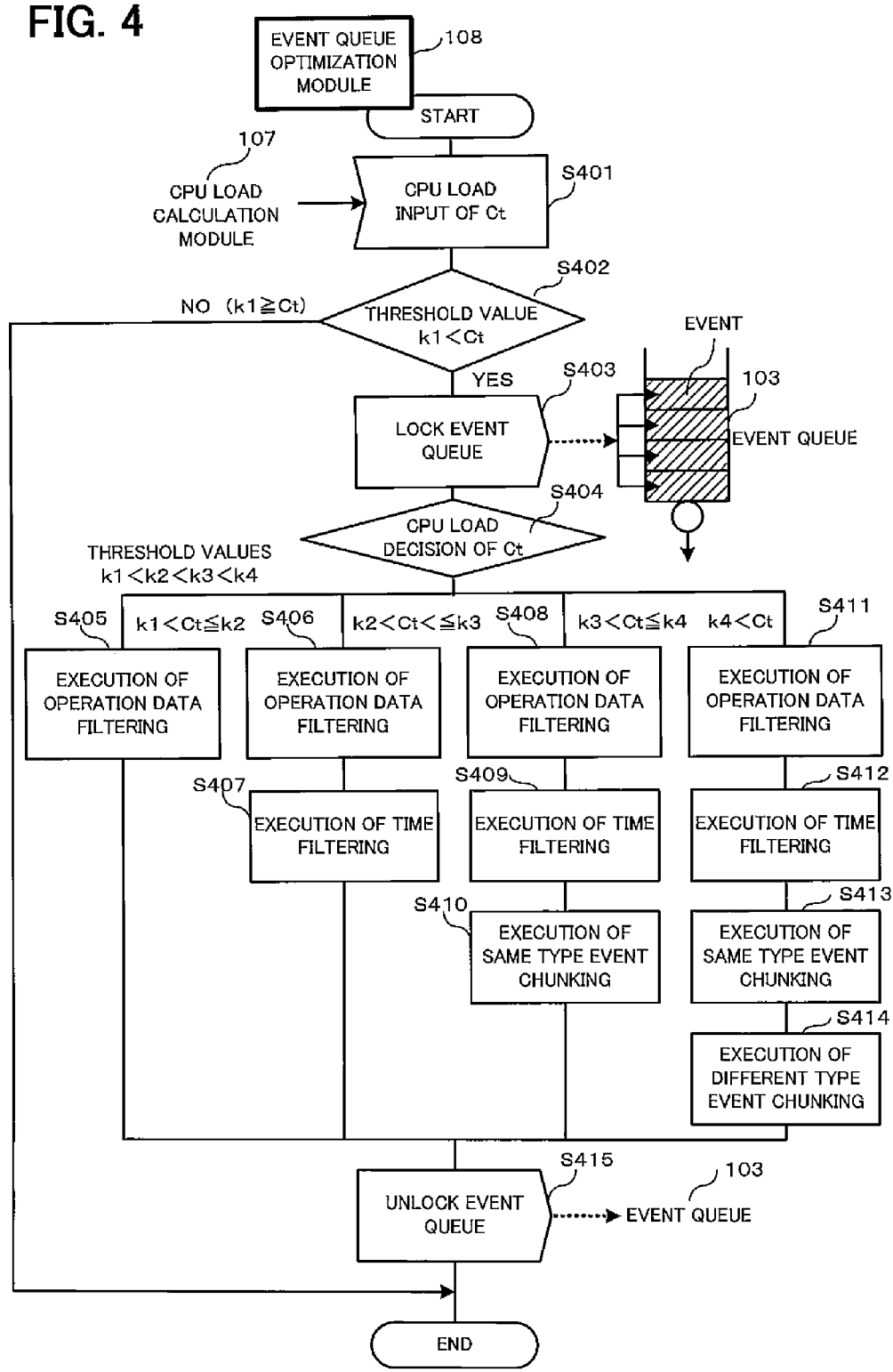
FIG. 4 is a flowchart of an event queue optimization module according to an embodiment of the present invention.

FIG. 4 is a flowchart of the event queue optimization module in the present invention.

(S401) First of all, the event queue optimization module 108 inputs the CPU load Ct from the CPU load calculation module 107. The CPU load Ct is an estimated load for actual execution of scheduled tasks accumulated in the task queue.

(S402) Then, it is determined whether the CPU load Ct is larger than a threshold value k1 or not. It is here determined whether the processing delay larger than the threshold value k1 occurs or not. When the load Ct is less than or equal to the value k1 (k1<=Ct), the process is finished. In this case, the event queue 102 accumulates the events as unchanged, without any optimization (reconfiguration). As a result, the event control module 101 takes out the events in the order of their occurrences from the event queue 102.

(S403) When the load Ct is larger than the value k1 (k1<Ct), namely, the processing delay larger than the value k1 occurs, the event queue 102 is locked to stop the input and output of the events into and from the event queue 102. After locking the event queue 102, an optimization process is executed with respect to the plurality of events accumulated there.

(S404) At first, it is determined how the CPU load Ct relates to threshold values k1-k4. The optimization process is performed so as to select and execute one of several types of filtering processes and chunking processes dynamically and step by step (in a phased manner or in incremental steps) depending on the CPU load Ct. The "filtering process" is to delete one or more events based on the optimization definition information for the plural events accumulated in the event queue 102. Also, the "chunking process" is to integrate or consolidate some of the plural events into one event based on the optimization definition information. The threshold values for decision have a relation of k1<k2<k3<k4. All these threshold values are constants of less than or equal to 1. These values, for example, are allowed to be k1=0.1, k2=0.25, k3=0.5, k4=0.75. These four threshold values may be predetermined or dynamically based on the history information of tasks executed in the past.

(S405) When the load Ct is larger than the value k1, and smaller than or equal to the value k2 (k1<Ct<=k2), only the "operation data or operation-data-based filtering" is executed.

(S406) When the load Ct is larger than the value k2, and smaller than or equal to the value k3 (k2<Ct<=k3), the "operation data or operation-data-based filtering" is executed first.

(S407) Subsequently, the "time or time-based filtering" is executed.

(S408) When the load Ct is larger than the value k3, and smaller than or equal to the value k4 (k3<Ct<=k4), the "operation-data-based filtering" is executed first.

(S409) Subsequently the "time or time-based filtering" is executed.

(S410) And the "same type event or identical-event-based chunking" is executed.

(S411) When the load Ct is larger than the value k4 (k4<Ct), the "operation data or operation-data-based filtering" is executed first.

(S412) Subsequently the "time or time-based filtering" is executed.

(S413) Subsequently the "same type event or identical-event-based chunking" is executed.

(S414) And the "different type event or different-event-based chunking" is executed.

According to these steps (S405-S414), the event queue is optimized in a manner varying depending on the value of CPU load Ct. In other words, when the load Ct is smaller, the number of the applied optimization processes is reduced, and when the load Ct is larger, the number of applied optimization processes is increased. Owing to this, by suppressing a decrease in a task execution speed, event processing that is determined to be unnecessary in a task execution can be omitted.

(S415) When optimization processes for the event queue (S405-S414) are finished, the event queue 102 is unlocked to resume the input and output of events into and from the event queue 102.

It is noted that the order (S405-S414) in which the optimization processes are executed step by step may be, not limited to the above-mentioned order, an alternative order. For example, the alternative order may be the description order of the "time filtering," the "operation data filtering," the "same type event chunking" and the "different type event chunking."

However, for the selection of the optimization processes for the event queue, a high priority should be given to such an optimization process that has a little cost consumption of such as a CPU load or an amount of memory used and that has a high performance effect provided after the optimization process. For example, many events that are subject to the chunking processes are also subject to the filtering processes. Then, according to the embodiment of the present invention, the "filtering process" may be applied before the "chunking process."

Figure 5:
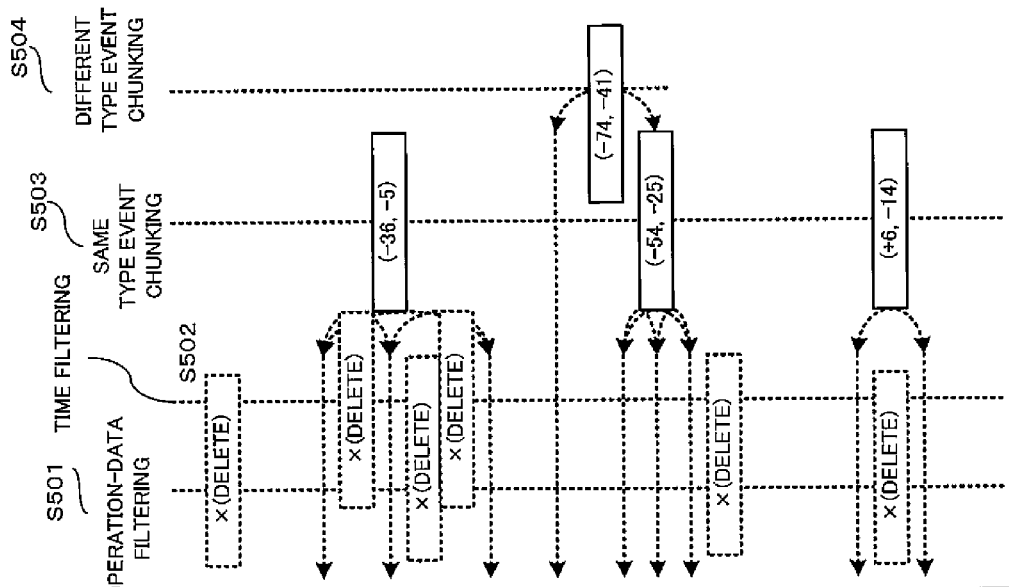
FIG. 5 is an optimization illustration for an event queue according to an embodiment of the present invention.

FIGS. 5 and 6 illustrate the system statuses before and after the optimization of the event queue is performed in the present embodiment of the present invention.

FIG. 5 shows information of the event queue before the optimization processing begins.

The device/operation types are Mouse/Move, Mouse/Click, MobileKeyboard/Press and FullKeyboard/Press. Also, a group of events (event IDs: 0001-0024) occurring at points of time 66460-69510 is shown.

(S501) First, it is assumed that the operation-data-based filtering process according to the optimization definition information is prescribed as shown in table 1.

TABLE 1

Operation-data-based filtering process

| Device/operation type | processing condition | Processing method |
|---|---|---|
| Mouse/Move | movement distance is less than Ma | delete |
| Keyboard/Press | keycode is undefined | delete |

Here, for example, the movement distance Ma is assumed to be four pixels. According to FIG. 5, events corresponding to the optimization definition information have event IDs of "0004," "0009," "0018," and "0024," respectively. The device type of these events is "Mouse/Move", and the movement distances are less than four pixels. Then, these events are deleted by the operation-data-based filtering process.

(S502) Next, the time-based filtering process according to the optimization definition information is assumed to be prescribed as shown in the following table 2.

TABLE 2

Time filtering process

| Device/operation type | Processing condition | Processing method |
|---|---|---|
| Mouse/Move | Event occurs within T1 since latest event | delete |
| Mouse/Click | Event occurs within T2 since latest event | delete |
| Keyboard/Press | Event occurs within T3 since latest event | delete |

Here, for example, it is assumed that T1=100 ms, T2=200 ms and T3=300 ms. After processing of the step S501, events corresponding to the optimization definition information have event IDs of "0017" and "0020," respectively. The device type of these events is "Mouse/Move", and the time interval for event occurrences is less than 100 ms. These events are deleted by the time-based filtering process.

(S503) Then, a same type event filtering process according to the optimization definition information is assumed to be prescribed shown in the following table 3.

TABLE 3

Identical-event-based chunking process

| Device/operation type | Processing conditions | Processing method |
|---|---|---|
| Mouse/Move | two or more events of the same type occur consecutively | Integrate into one event |
| Keyboard/Press | two or more events of the same type occur consecutively and key code is "direction key" | Integrate into one event |
| Keyboard/Press | two or more events of the same type occur consecutively and key code is "key for task change" | Process the last event only |

After processing of the step S502, sets of events corresponding to the optimization definition information have a set of event IDs of "0003: 0005", a set of event IDs of "0010: 0011: 0012," and a set of event IDs of "0016: 0019: 0021," respectively. As for the set of event IDs "0003: 0005," the device/operation type is "Mouse/Move", and the same events continue. Three events are integrated into one event with event ID "0005," and the corresponding sets of the operation data of these events are summed as the operation data of the one event of event ID "0005." Similarly the events with a set of event IDs "0010: 0011: 0012" are integrated into one event with event ID "0012." Furthermore, the events with a set of event IDs "0016: 0019: 0021" are integrated into one event with event ID "0021."

(S504) Then, a different type event filtering process in the optimization definition information is assumed to be prescribed shown in the following table 4.

TABLE 4

Different-event-based chunking process

| Device/operation type | Processing conditions | Processing method |
|---|---|---|
| Mouse/Move Keyboard/Press | Two or more sets of two events occur repeatedly within T4 and keycode is "key for task change" | After processing the last event relating to keycode, integrate events relating to movement of mouse cursor into one event and process it |
| Mouse/Click Keyboard/Press | Two events occur consecutively within T5 and keycode is "key for decision" | After deleting the first event process the last event |

For example, here, it is assumed T4=1200 ms and T5=600 ms. After processing of the step S503, the group of events corresponding to the optimization definition information has a set of event IDs "0012: 0013: 0014: 0015." These events repeat the device/operation type of "Mouse/Move" and the device/operation type of "MobileKeyboard/Press" alternately. Also, each key-code is the "key for task change" corresponding to the keys "F1" and "F2." Then, two of these events of which have "Mouse/Move" are integrated into one event, and a first one of two of these events which have the "key for task change" is deleted, and a second one of the two events of the "key for task change" remains unchanged.

The events before the event queue optimization shown in FIG. 5 are processed through the steps S501-S504, and turn out to be the events after the optimization shown in FIG. 6. According to FIGS. 5 and 6, while the event group before the optimization is 24, after the optimization, the number of the events is decreased to 11.

It is noted that the predetermined conditions for the optimization definition information are desirably changed according to the capacity of a memory and/or the processing capability of the CPU on the apparatus. For example, the threshold values for the time interval of event occurrences can be variable.

According to the present embodiment, the number of events accumulated in the event queue can be reduced, while additional processing of the CPU is needed in order to optimize the event queue. One of tasks assumed when the present embodiment is practiced is rendering processing of a display screen, and the amount of the processing is very large. For example, there is a case in which an event such as a drag and drop operation of a display window on a desktop generated by a mouse operation. In such a case, compared to the amount of processing for the optimization of the event queue, the amount of re-rendering processing is very large. The present embodiment, which optimizes the event queue, is advantageous in order to execute the re-rendering process faster.

Also, the optimization of the event queue, although not limited to the four different optimization processed employed in the embodiment, can include or can be replaced with other filtering processes or chunking processes. For example, not only process based on the operation data generated when an event occur or the length of a time between events occurring, but also a process based on a temporal change in the operation data, that is, how much the operation data changes during a unit-time period, or a difference in the temporal change between the unit-time periods are applicable. Further, when the summation of values of Euclid data is calculated for events, the summation becomes zero occasionally. Thus when a series of events are replaced with one event, the replacement is executed after analyzing the semantics of the series of events. For example, when a mouse is moved circularly, the event of the mouse is converted into an event representing the circular motion.

According to the event processing apparatus and the method of the present embodiment explained in detail, because the number of events accumulated in the event queue can be reduced based on the optimization definition information, even if the embedded apparatus equipped with the low computing performance CPU and the OS, a large number of events occurring for a short time can effectively processed.

According to the present embodiment, particularly when the embedded apparatus equipped with the CPU with low computing performance like a cellular phone or a personal digital assistance, and when a window displayed on the display screen of the apparatus is operated by a pointing device like a mouse, the number of events accumulated in the event queue decreases effectively. The present embodiment is also able to be applied to various apparatuses without considering the relation between the CPU processing capability and the task processing capability, because the event queue optimization process is executed dynamically and step by step depending on the time-varying CPU load in real time.

The present embodiment is able to surely delete events that are determined unnecessary for the task execution, because of the execution of the filtering processes or and/or the chunking processes for a group of events accumulated in the event queue by considering the event occurrence order, the device/operation type, the occurrence time and the operation data.

Many widely different embodiments of the present invention may be constructed without departing from the spirit and scope of the present invention. It should be understood that the present invention is not limited to the specific embodiments described in the specification, except as defined in the appended claims.

The invention claimed is:

1. An event processing apparatus comprising:
a memory including an event queue that temporarily accumulates a plurality of events when occurring and including a task queue that temporarily accumulates a plurality of tasks relating to the plurality of events read out from the event queue;
task execution means for executing a task read out from said task queue;
task execution time memory for receiving a task execution time from said task execution means, and for storing a mean execution time corresponding to a task identifier;
central-processing-unit (CPU) load calculation means for using said task execution time memory to calculate a CPU load by dividing a sum of mean execution times for all unexecuted tasks accumulated in said task queue by a CPU processing time unit; and
event queue optimization means for executing, depending on the CPU load, filtering processes to delete one or more events based on optimization definition information, and/or chunking processes to integrate a plurality of events accumulated in the event queue into one event based on the optimization definition information.

2. An event processing apparatus comprising:
a memory including an event queue that temporarily accumulates a plurality of events when occurring and including a task queue that temporarily accumulates a plurality of tasks relating to the plurality of events that are read out from the event queue; and
a central processing unit (CPU) executing:
a CPU-load calculation module that calculates a load of the CPU by dividing a total sum of mean execution-times for all unexecuted tasks that have been accumulated in the task queue, by a CPU time per transaction; and
an event-queue optimization module that optimizes the events accumulated in the event queue, by performing at least one of deletion and integration of the events, based on the calculation of the CPU load.

3. The event processing apparatus according to claim 2, wherein the CPU executes the event-queue optimization module at predetermined time intervals, or upon a user instruction for event-queue optimization.

4. The event processing apparatus according to claim 2, wherein the event-queue optimization module selects, depending on the calculation of the CPU load, at least one of:
one or more filtering processes to delete one or more of the plurality of events, based on optimization definition information; and
one or more chunking processes to integrate a sub-plurality of the plurality of events into one event, based on the optimization definition information.

5. The event processing apparatus according to claim 4, wherein the event-queue optimization module locks the event queue to temporarily stop event input/output operation of the event queue prior to execution by the CPU of the at least one selected process, and is further configured to unlock the event queue to allow the event input/output operation of the event queue upon completion of the at least one selected process.

6. The event processing apparatus according to claim 4, wherein each of the plurality of events has at least one of a device/operation type, an occurrence time, and operation data,
the optimization definition information defines predetermined conditions for the at least one of the device/operation type, the occurrence time, and the operation data, for execution of the at least one selected process, and the event-queue optimization module determines whether the predetermined conditions have been met for every event accumulated in the event queue.

7. The event processing apparatus according to claim 6, wherein the event-queue optimization module, when the at least one selected process includes the one or more filtering processes, includes:
   an operation-data-based filtering process in which, if the operation data for each one of the plurality of events is undefined, or if an operation amount represented by the operation data is smaller than a predetermined first threshold value, then each one of the plurality of events having the undefined operation data is deleted; and
   a time-based filtering process in which, if a time between consecutive ones of the plurality of events that are identical in the device/operation type is shorter than a predetermined second threshold value, then at least one of the consecutive events are deleted, and
   wherein the event-queue optimization module, when the at least one selected process includes the one or more chunking processes, includes:
   an identical-event-based chunking process in which a sub-plurality of the plurality of events, which occur consecutively for a predetermined length of time and are identical in the device/operation type, are integrated into one event; and
   a different-event-based chunking process in which a sub-plurality of the plurality of events, which satisfy a predetermined condition and are not identical in the device/operation type, are integrated into one event.

8. The event processing apparatus according to claim 6, wherein the predetermined conditions vary depending on at least one of a processing capability of the CPU and a capacity of a memory used for the CPU.

9. An event processing apparatus comprising:
   a memory including an event queue that temporarily accumulates a plurality of events when occurring and including a task queue that temporarily accumulates a plurality of tasks relating to the plurality of events that are read out from the event queue, each of the plurality of events having a device/operation type, an occurrence time, and operation data; and
   a central processing unit (CPU) executing:
   a CPU-load calculation module that calculates a load of the CPU so as to reflect a total sum of mean execution-times for all unexecuted tasks that have been accumulated in the task queue; and
   an event-queue optimization module that optimizes the events accumulated in the event queue, based on the calculation of the CPU load,
   wherein, if the CPU load is larger than a threshold k1 but not larger than a threshold k2 (>k1), the event-queue optimization module includes an operation-data-based filtering process in which, if an amount represented by the operation data for each event in the event queue is smaller than a predetermined first threshold value, then the event is deleted,
   wherein, if the CPU load is larger than the threshold k2 but not larger than a threshold k3 (>k2), the event-queue optimization module includes both the operation-data-based filtering process and a time-based filtering process in which, if a time interval between a first one and a last one of a sub-plurality of the plurality of events which are identical in the device/operation type is shorter than a predetermined second threshold value, then the last one of the sub-plurality of the plurality of events is deleted,
   wherein, if the CPU load is larger than the threshold k3 but not larger than a threshold k4 (>k3), the event-queue optimization module includes the operation-data-based filtering process, the time-based filtering process, and an identical-event-based chunking process in which a sub-plurality of the plurality of events, which occur consecutively and are identical in the device/operation type, are integrated into one event, and
   wherein, if the CPU load is larger than the threshold k4, the event-queue optimization module includes the operation-data-based filtering process, the time-based filtering process, the identical-event-based chunking process, and a different-event-based chunking process in which a sub-plurality of the plurality of events, which satisfy a predetermined condition and are not identical in the device/operation type, are integrated into one event.

10. A method of operating an event processing apparatus having an event queue that temporarily accumulates a plurality of events when occurring, a task queue for temporarily accumulating a plurality of tasks relating to the plurality of events that are read out from the event queue, and a central processing unit (CPU) executing the method, the method comprising:
    calculating a load of the CPU by dividing a total sum of mean execution-times for all unexecuted tasks that have been accumulated in the task queue, by a CPU time per transaction; and
    optimizing the events accumulated in the event queue, by performing at least one of deletion and integration of the events, based on the calculation of the CPU load.

11. The method according to claim 10, wherein said optimizing includes selecting, depending on the calculation of the CPU load, at least one from:
    one or more filtering processes to delete one or more of the plurality of events, based on optimization definition information; and
    one or more chunking processes to integrate a sub-plurality of the plurality of events into one event, based on the optimization definition information.

* * * * *